Figure 1:
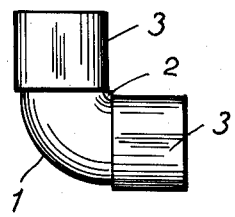

July 2, 1963   B. J. R. CHRISTENSEN ETAL   3,095,613
METHOD AND MEANS FOR THE PRODUCTION OF HOLLOW BENT
ARTICLES OF PLASTIC MATERIAL
Filed Dec. 16, 1960   2 Sheets-Sheet 1

Inventors

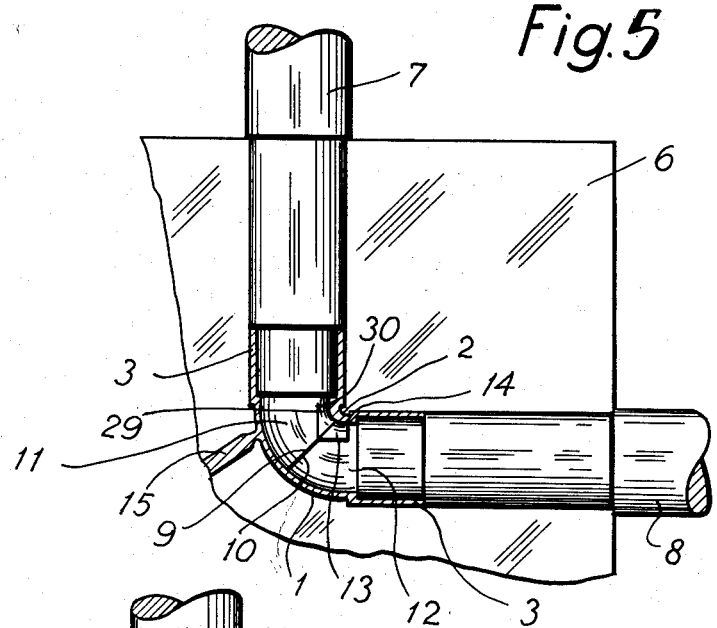
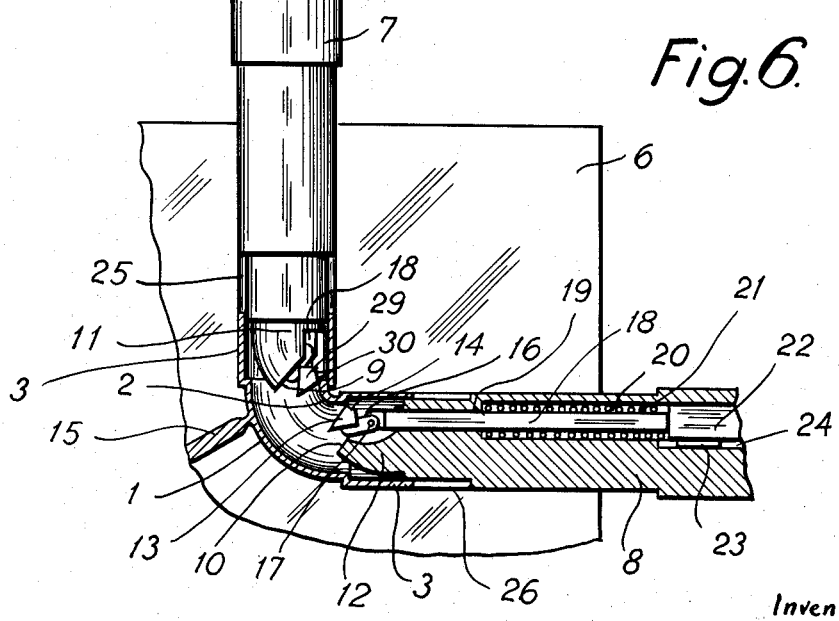

3,095,613
METHOD AND MEANS FOR THE PRODUCTION OF HOLLOW BENT ARTICLES OF PLASTIC MATERIAL
Børge Johannes Ravn Christensen, Copenhagen-Bagsvaerd, and Ib Refsholm, Copenhagen N, Denmark (both % Patentbureau Erik Larsen, Reventlowsgade 18, Copenhagen V, Denmark)
Filed Dec. 16, 1960, Ser. No. 76,237
Claims priority, application Denmark, Dec. 17, 1959
2 Claims. (Cl. 18—42)

This invention relates to a mold for injection molding of bent plastic articles having through cavities, the mold having a pair of separable mold parts having cavities therein conforming the exterior shape of the article to be molded, and cores movable into and out of the mold cavity where the molded article has an interior through cavity, the cores conforming the shape thereof and thereby abutting closely together in this cavity.

It is desirable and often required, e.g. in the case of hollow bent articles for electric wires or cables, that the inner wall parts of the article are suitably rounded not only as prior at the convex but also at the concave corner portion or portions of the article.

It is an object of the invention to provide improved cores in a mold of the character indicated which cores are suitable for conforming suitably rounded inner concave corner portions in hollow bent articles in a mold of the character indicated.

This is obtained in a mold according to the present invention, in which the extractable cores each have an extractable additional segmental core part which core parts during the molding abut closely against each other and in their associated cores and each have an arciformed surface which surfaces together conform an inner rounded and concave curved wall portion in the cavity in the article and which core parts are so extractable from their associated cores and movable that they can be drawn completely inside the limitation of the remaining part of their associated cores when these are drawn out of the cavity in the molded article.

Thus, it is possible to injection mold inner arched concave corners in hollow bent articles such as knees, angular tubes, T-tubes and other tube branchings, and such inner curved and rounded corners are very serviceable not only when drawing wires or cables through the hollow articles and past said corners without the same cutting into the wire or cable, but also in case of a flow of medium through the hollow article without forming eddies in the medium and without noise in the article.

Furthermore, according to the present invention, the movable segmental core parts each may be rotatably connected to a displaceable rod in its associated core having a pressure screw spring extending around the said rod to pull off the movable core part closely in towards the core to the correct molding position.

Figure 2:
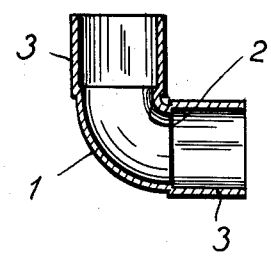
Figure 3:
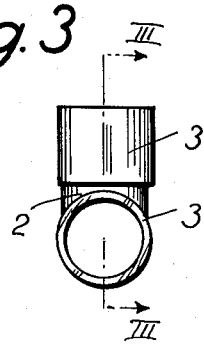
Figure 4:
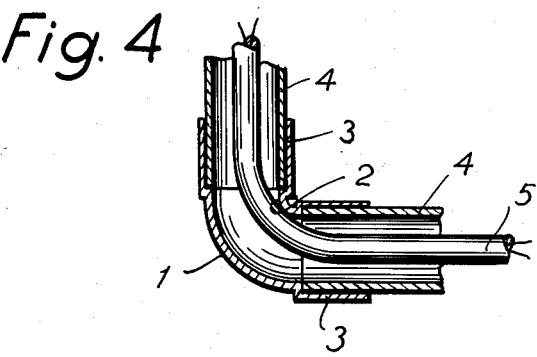

Further details with regard to the mold according to the present invention are described, by way of example, in detail hereinafter with reference to the accompanying drawings in which:

FIG. 1 shows an embodiment of an article molded in a mold according to the invention, in side view, FIG. 2 shows the same article in side view at right angles to the side in FIG. 1, FIG. 3 shows the article in section according to the line III—III in FIG. 2, FIG. 4 shows the article viewed in section along the line III—III in FIG. 2, with ends of two connected tubes and a wire drawn through the same, FIG. 5 shows an embodiment of cores arranged in molding position in a part of an injection mold, in front view, and FIG. 6 shows the same with the cores partly drawn out of an article molded in the mold and with the article and one core partly in longitudinal section.

Referring to the drawings, the illustrated injection molded article is a knee with an arched portion the convex part 1 of which in a longitudinal section through the article is arched, and the concave part 2 of which in the corresponding section is arched in an arch which is concentric with the arch formed by the convex part so that the area of a radial section through the cavity between the parts 1 and 2 is uniform and equal to the clearance in the tubes 4 designed for insertion into cylindrical end parts 3 of the knee, which end parts 3 have a clearance equal to the clearance in the tubes 4 plus the wall thickness of the same. When the ends of the tubes 4 have been inserted into the end parts 3 of the knee, as shown in FIG. 4, there is in the parts 1 to 4 a smooth evenly bent and in all sections uniform clearance which is well suited for the flow of media or for the drawing of a wire 5 through these parts.

The article is according to the present invention injection molded in an injection mold of the character prior indicated of which FIGS. 5 and 6 show a corner of one mold part. In holes 25 and 26 in the mold are displaceably arranged stepped cylindrical cores 7 and 8 which in known manner can be moved inwards and outwards respectively in the mold before and after respectively the molding of an article in the mold.

The cores 7 and 8 have obliquely cut off end faces 9 and 10 adapted for close abutment against each other, and arched end parts 11 and 12 which together with a movable part 13 on the core 8 and a movable part 29 on the core 7 are adapted to conform the cavity between the parts 1 and 2 of a knee. The movable core part 13 has an arched face 14 and the movable core part 29 has an arched face 30. The faces 14 and 30 are adapted to conform the inner curved face of the concave part 2 of a knee in the molding position shown in FIG. 5. The mold is provided with an inlet 15 to the cavity between the parts and cores of the mold.

The core parts 13 and 29 are each arranged on an arm 16 rotatable on a pin 17 on a rod 18 displaceable in a bore in the core 8 or in the core 7. In a widened out part 20 of the bore there is arranged around the rod 18 a helical compression spring 21 one end of which abuts against the bottom of the enlarged portion 20 or the recess between the latter and the part 19 of the bore, and the other end of which abuts against a thicker part 22 of the rod 18 which thicker rod portion 22 is displaceable in the part 20 of the bore and has a key 23 sliding in a groove 24 in the core 8 or in the core 7.

When the parts have been moved together to the molding position shown in FIG. 5, an article 1—3 according to the invention may be molded in the mold, whereafter the cores 7 and 8 are drawn out from the mold, as shown in FIG. 6, seeing that the core parts 13 and 29 will thus be displaced and swung in relation to the cores 8 and 7 as shown and can be drawn out of the completely molded article. If the cores 7 and 8 are moved back to the position shown in FIG. 5, then the core parts 13 and 29 will by actuation of the springs 21 be moved back to the positions on the cores 8 and 7 shown in FIG. 5 ready for the molding of a fresh article. The core parts 13 and 29 have obliquely cut off end faces adapted for close abutment against each other in the molding position, FIG. 5.

The parts of the mold, cores and core parts may be constructed in any suitable way other than the shown, just as the mold according to the invention may be used for similar articles other than those shown and described e.g. for T-tubes or other tube assemblies or branchings of any suitable plastic material.

We claim:
1. A mold for injection molding of bent plastic articles having through cavities, the mold having a pair of separable mold parts having cavities therein conforming the exterior shape of the article to be molded, and cores movable into and out of the mold cavity where the molded article has an interior through cavity, the cores substantially conforming the shape thereof and thereby abutting closely together in this cavity, the cores each having an extractable additional segmental core part which core parts during the molding abut closely against each other and in their associated cores and each have an arciformed surface which surfaces together conform an inner rounded and concave curved wall portion in the cavity in the article and which core parts are so extractable from their associated cores and movable that they can be drawn completely inside the limitation of the remaining part of their associated cores when these are drawn out of the cavity in the molded article.

2. A mold according to claim 1 further characterized in that the movable segmental core parts each is rotatably connected to a displaceable rod in its associated core having a pressure screw spring extending around the said rod to pull off the movable core part closely in towards the core to the correct molding position.

References Cited in the file of this patent
UNITED STATES PATENTS

| | | |
|---|---|---|
| 224,517 | Cox | Feb. 17, 1880 |
| 373,572 | Van Winkle | Nov. 22, 1887 |
| 543,376 | Cole | July 23, 1895 |
| 648,341 | Boch | Apr. 24, 1900 |
| 669,913 | Dalton | Mar. 12, 1901 |
| 1,582,143 | Perrault | Apr. 27, 1926 |
| 1,761,568 | Kersten | June 3, 1930 |
| 2,477,368 | Gits | July 26, 1949 |
| 2,566,686 | Vlcek | Sept. 4, 1951 |